Feb. 27, 1962 J. ARVAN 3,022,722
AUTOMATIC COOKING APPARATUS
Filed March 7, 1960 6 Sheets-Sheet 1

INVENTOR.
John Arvan
BY Irving Seidman
ATTORNEY

INVENTOR.
John Arvan
BY Irving Seidman
ATTORNEY

*INVENTOR.*
John Arvan
BY Irving Seidman
ATTORNEY

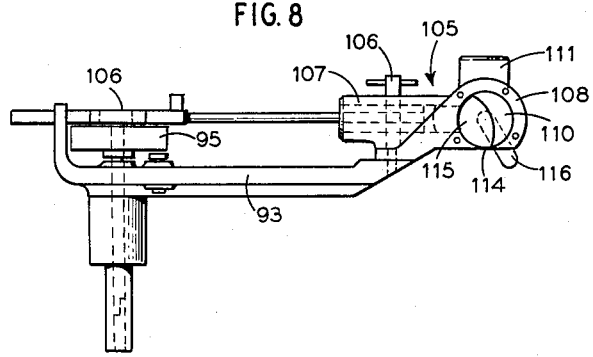
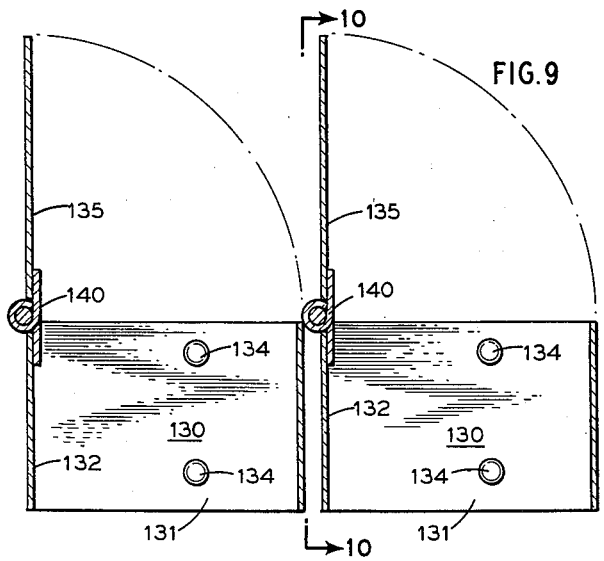
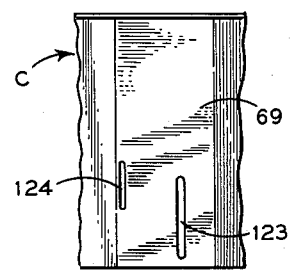
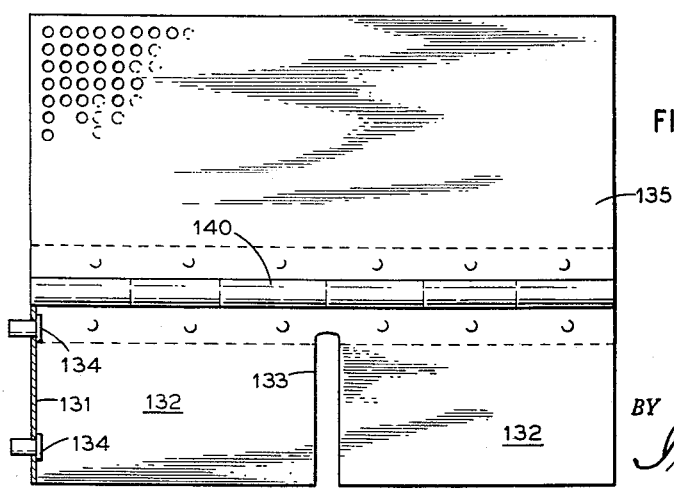

Feb. 27, 1962 J. ARVAN 3,022,722
AUTOMATIC COOKING APPARATUS
Filed March 7, 1960 6 Sheets-Sheet 5

INVENTOR.
John Arvan
BY
Irving Seidman
ATTORNEY

Feb. 27, 1962  J. ARVAN  3,022,722
AUTOMATIC COOKING APPARATUS
Filed March 7, 1960  6 Sheets-Sheet 6
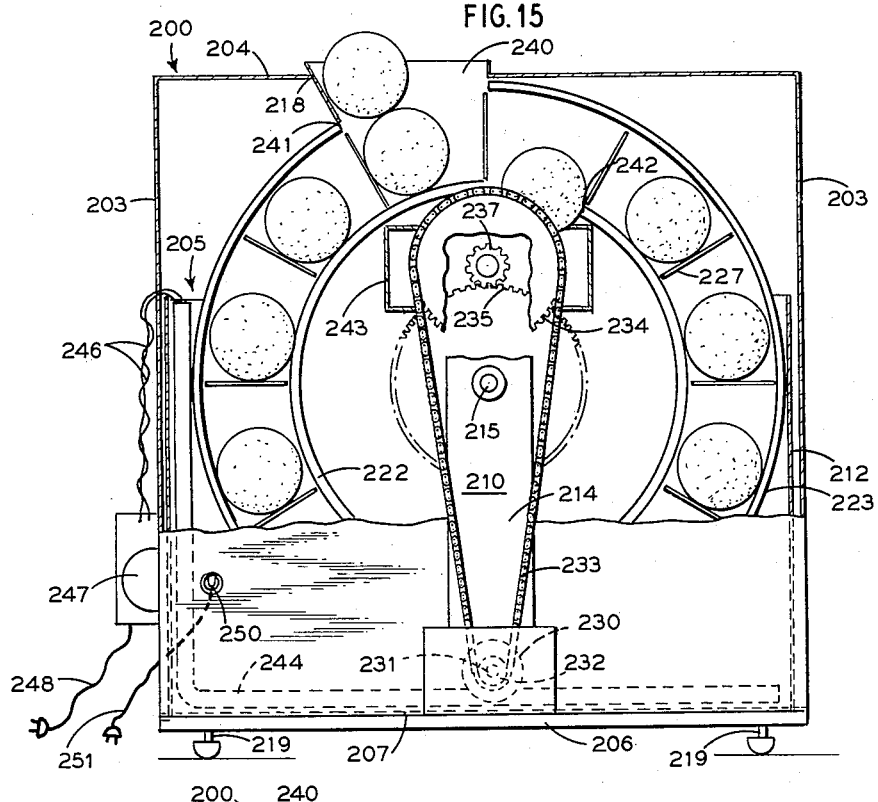
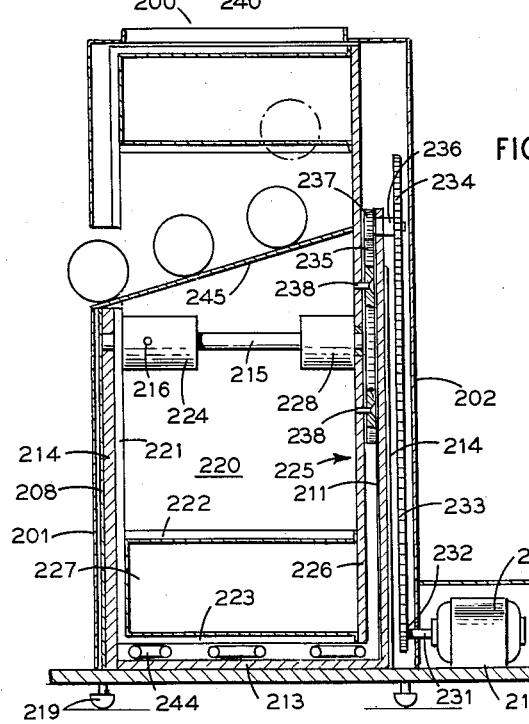
INVENTOR.
John Arvan
BY Irving Seidman
ATTORNEY

3,022,722
AUTOMATIC COOKING APPARATUS
John Arvan, Port Chester, N.Y., assignor to Luk-O-Ma Corporation, Port Chester, N.Y., a corporation
Filed Mar. 7, 1960, Ser. No. 13,104
14 Claims. (Cl. 99—354)

This invention relates to automatic cooking apparatus and, more particularly, to improved apparatus for automatically producing fried pastry items.

Various automatic or semi-automatic cookers have been provided for diverse food articles, for example doughnuts. However, known cookers have lacked the advantages of compactness, simplicity and ready portability. In addition, they have not been constructed for ready disassembly of parts for cleaning, which is important in the cooking of food.

In accordance with the present invention, an automatic apparatus is provided for feeding slugs of dough to a tank containing controllably heated cooking oil, passing the articles through the oil in the tank for a predetermined time required to thoroughly fry the article, and ejecting the cooked food article. In addition, all parts, and particularly those in contact with the food, are readily disassembled for inspection, repair, replacement and, most importantly, thorough cleaning.

More specifically, the cooker comprises a lower support base on which is mounted an electric motor driving the input gear of a main gear box. Above the lower support base there is an upper support base on which is a support for an annular tank containing the cooking oil which is heated, preferably, by electric heating coils. A relatively low circular partition divides this tank into two annular sections.

A "polygon," which may have, for example, 18 equal sides, has a polygonal wall or skirt extending substantially vertical downwardly into the tank, and each side has vertically slidably mounted thereon a U-shape bucket. Each bucket includes a central wall engaging the polygon side and a pair of side walls extending perpendicularly to the central wall and slotted to fit over the circular partition. The tank is thus effectively divided into a number of separate compartments, equal to twice the number of sides of the polygon, by the circular partition and the "buckets." The polygon is rotated step-by-step about a vertical axis by a drive from the gear box.

The gear box has an input or drive shaft chain driven from the motor. Through worm and worm gear assemblies, or other suitable high reduction gearing, rotation of the input shaft is transmitted to a substantially vertical main shaft which, through bevel gears, drives a horizontal shaft having an ejector cam on its outer end outside the gear box.

The main shaft has fixed to rotate therewith a master sector gear having teeth on only a small sector of its periphery. This sector gear, with the main shaft, acts as a sequence timer for the step-by-step operation of the cooker.

A shaft bearing on the cover or top wall of the gear box extends through an opening in the upper base and is engaged in a relatively elongated vertical tube or shaft housing which has an upper end in which is engaged a shaft bearing on a cantilever support for a dough supply hopper. Removably supported on this cantilever support is a cam operated plural piston pump including mechanism for oscillating a rotary cutter for dividing dough drawn from the hopper by the pump into lumps which are discharged by the pump into the tank.

The shaft bearings support disengageably coupled shafts for driving of a rotary pump-operating cam by means in the gear housing. This means comprises a first slave sector gear having teeth engageable with those on the master sector gear. This first slave sector gear is rotated one revolution during a small part of each revolution of the master sector gear. Immediately after rotating the first slave sector gear, the master sector gear imparts one revolution to a second slave sector gear which, through suitable drive gearing, rotates the "polygon" through the angle subtending one polygonal side thereof.

The pumps have pistons of "Teflon" or any other suitable inert plastic composition materials. As the pistons are retracted by the cam operating on a yoke attached to the pistons, the rotary or oscillatable cutter is turned to connect the pump cylinders to the hopper outlets. Gobs or lumps of dough are thus drawn into the pump cylinders and, as the pistons are advanced, the rotary cutter is turned in the reverse direction to sever the lumps from the dough in the hopper while connecting the cylinders to valve outlets for ejection of the dough globs to fall into the pair of tank compartments then aligned and stationary under the hopper outlets.

At the dough receiving position, the buckets are elevated to project above the level of the heated oil and perforated covers hinged to their side walls are opened, all this being effected by mechanism coacting with a cam extending along the bottom of the tank. The dough globs fall into the heated cooking oil, which is at a temperature of preferably 250–375° F., and drop momentarily into shaping depressions or concave recesses, preferably hemispherical, in the bottom wall of the tank. After approximately 0.5 second, the globs rise and are moved step-by-step around the tank by the buckets as the polygon is stepped by its gear drive. The globs rise until they float at the surface of the oil and, after about 10 to 12 seconds, the globs turn over due to the heavier uncooked dough above the oil level.

The perforated covers hinged to one side wall of each bucket are spring biased to a closed position but, during substantially the first half of the dough charging and cooking cycle, are held in an open position. A novel mechanism is provided, coacting with the cam on the bottom wall of the tank, to effect swinging of the covers to the open position responsive to raising of the buckets just prior to the dough charging station. About 25 seconds after the dough is charged into the oil, the tank cam provides for the buckets to be lowered, under a spring bias, to below the surface of the oil. As the buckets descend, the perforated covers close to depress the dough globs about ¼" below the surface of the oil. The closed covers then hold the globs entrapped in the oil until the compartments reach the ejection station, at which point the buckets are raised and the perforated covers swing open.

At this latter station, the covers are open and a perforated ejection plate, operated by the ejector cam, rises from just below the bottom edges of the flights to lift the dough globs, and then tilts outwardly to eject the cooked articles. The pockets are then re-charged as described.

In another embodiment of the invention, the cylindrical stationary tank has a horizontal axis and comprises radially spaced inner and outer cylindrical drums projecting axially from the side wall of the tank. The tank is enclosed in an outer casing having a fixed axle on which is rotatably mounted a circular plate having radial flights projecting axially between the inner and outer drums of the tank. This circular plate is rotated at a slow speed by an electric motor through a speed reducing chain drive and gearing.

This embodiment of the invention is arranged to receive partially pre-cooked and preferably frozen food articles which are dropped through a chute in the top wall of the casing. The chute discharges the articles through an opening in the outer drum into the compartments formed by the flights. The food articles are then carried through the heated cooking oil in the tank and, just before each pocket reaches the charging position, it is aligned with an opening in the inner drum. The thoroughly cooked articles drop through this opening onto a sloping plate leading to an exit opening through the side walls of the drum and casing.

For an understanding of the invention principles, reference is made to the following descriptions of typical embodiments thereof as illustrated in the accompanying drawings. In the drawings:

FIG. 8 is a side elevation view of the pump mechanism;

FIG. 9 is a vertical sectional view of a pair of buckets;

FIG. 10 is a similar view at right angles to FIG. 9;

FIG. 13 is an elevation view of one side of the polygon skirt;

FIG. 15 is a front elevation view, with the front of the casing removed, of another form of apparatus embodying the invention; and FIG. 16 is a vertical axial sectional view of the apparatus shown in FIG. 15.

Figure 1:
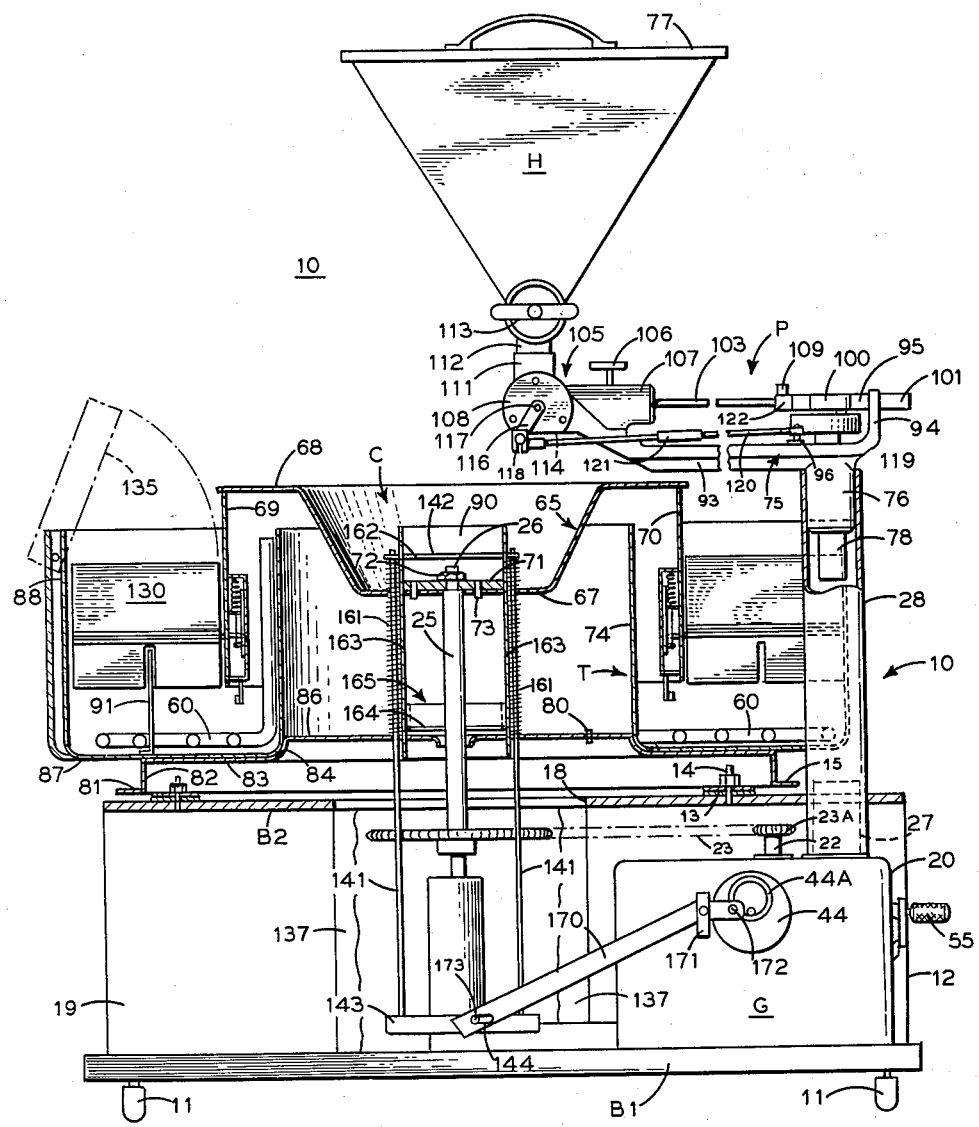
FIG. 1 is an elevation view, partly in section, of one form of apparatus embodying the invention.
Figure 2:
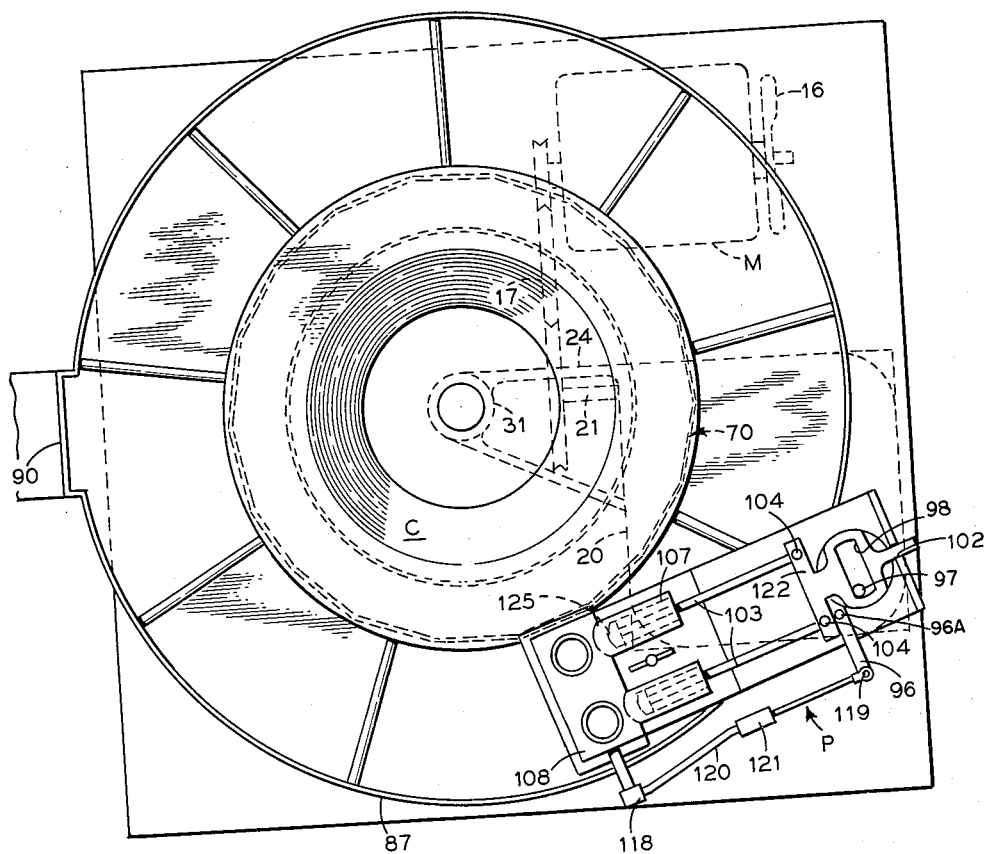
FIG. 2 is a part sectional plan view thereof.
Figure 6:
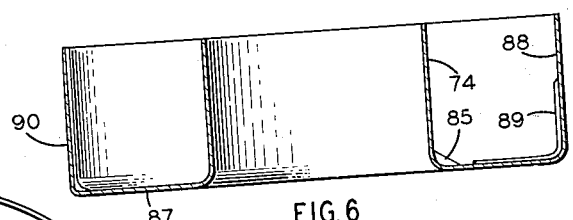
FIG. 6 is a vertical diametrical sectional view of the tank.
Figure 7:
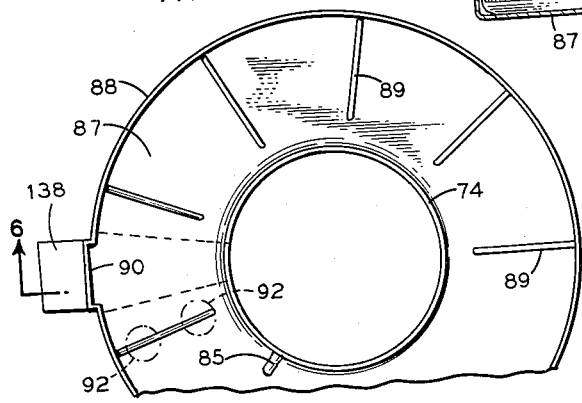
FIG. 7 is a sectional view illustrating a constructional detail of the tank.
Figure 3:
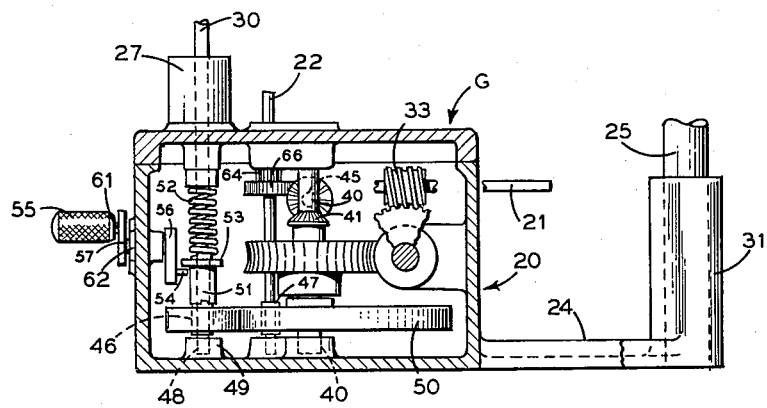
FIG. 3 is a side elevation view of the control gearing.
Figure 5:
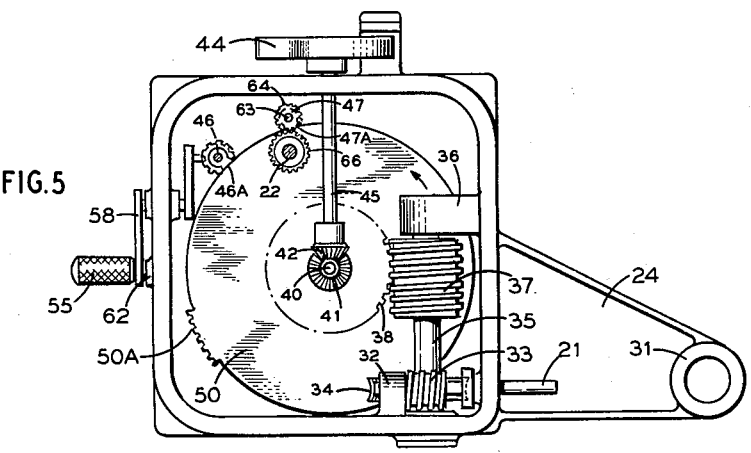
FIG. 5 is a plan view of the control gearing.
Figure 4:
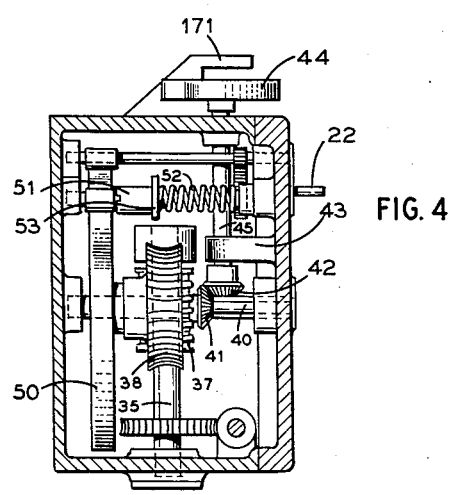
FIG. 4 is an end elevation view of the control gearing.

Referring to FIGS. 1 and 2, the cooking apparatus 10 comprises a lower base B-1, preferably of stainless steel, mounted on adjustable leveling lugs or feet 11. An upper base B-2 is provided with corner legs 12 secured to lower base B-1 and thus supported in vertically spaced relation to the lower base. Upper base B-2 has a circular rib 13 on its upper surface tapped to receive bolts 14 securing an inverted dish-shape tank support 15 to the upper base. An annular tank T, of stainless steel, is welded in interfitting relation to tank support 15 and heating coils 60 (shown) are disposed along the bottom wall of tank T to maintain the cooking oil therein at a pre-set temperature.

A motor M, provided with a cooling fan 16, is mounted on base B-1 and, through a speed reduction chain or belt drive 17 rotates the input shaft 21 of control gearing G enclosed in a housing 20 also mounted on base B-1. Gearing G includes a first output shaft 22 connected by a speed reducing chain drive 23 to operate a shaft 25 rotatably mounted in an extension arm 24 of housing 20 and extending substantially centrally from base B-1 through a relatively large central opening 18 in base B-2.

Shaft 25 has a reduced and threaded upper end 26 forming a shoulder on which is seated a centrally apertured base 67 of an inverted frusto-conical axial recess 65 in the upper wall 68 of a carrier C. A circular plate 71 overlies base 67 and is secured to shaft extension 26 by a nut 72, plate 71 having pins 73 engaged in base 67. The upper wall 68 of carrier C extends radially outwardly over the inner wall 74 of tank T, in vertically spaced relation thereto, and is integral with a depending polygonal skirt 70 extending downwardly into tank T in relatively close but radially spaced relation to wall 74 of the tank. Skirt 70 may have, for example, eighteen (18) sides, although a greater or lesser number of sides may be provided as determined by the desired capacity and rate of operation of apparatus 10.

Near one corner, gear housing 20 has a tubular boss 27 projecting from its upper wall, boss 27 having telescoped thereover the lower end of a vertical sleeve 28 extending upwardly through an aperture in base B-2 and having its upper end somewhat above the level of top wall 68 of carrier C. A depending tubular boss 76 on the body 75 of a pump mechanism, generally indicated at P, is removably telescoped in the upper end of sleeve 28. Pump mechanism P extends horizontally and radially from sleeve 28 and its free end supports a hopper H for containing the dough and provided with a removable cover 77.

Gearing G has a second output shaft 30 which extends coaxially of tubular boss 27 and into sleeve 28, shaft 30 having an end shaped for disengageable driving coupling to a mating shaft 78 on pump mechanism P to operate the latter. Shafts 25 and 30 are periodically operated, in timed relation with each other, first to step carrier C by an angular distance equal to the angle subtended by each side of polygonal skirt 70, and second to cause pump mechanism P to withdraw dough gobs from hopper H and drop them into tank T.

A ventilated metal side wall structure 19 may be provided to enclose the space between bases B-1 and B-2, and thus protectively enclose motor M and gearing G in its housing 20. Input shaft 21 of gearing G extends outwardly over extension arm 24 which projects from the base of housing 20 and has a tubular boss 31 extending vertically from its outer end and providing a bearing for shaft 25.

Shaft 21 has a bearing in a first side wall of housing 20 and in a lug 32 on the inner surface of a second wall thereof. Adjacent lug 32, shaft 21 has secured thereto a worm 33 engaging a worm wheel 34 on a shaft 35 having a bearing in such side wall and in a lug 36 on the inner surface of such first side wall. A worm 37 on shaft 35 drives a worm gear 38 on a central vertical shaft 40 having a bearing in the top and bottom walls of housing 20.

A bevel gear 41 secured on shaft 40 meshes with a bevel gear 42 on a third output shaft 45 having a bearing in a lug 43 on the top wall of housing 20 and projecting through a third side wall thereof. On the outer end of shaft 45 is a cam 44 for operating the ejector mechaism.

Shaft 40 may be termed the main timer shaft. On this shaft, adjacent the bottom wall of housing 20, there is a master sector gear 50 having a gear tooth sector 50A extending over a short arc of its periphery. Sector 50A may comprise, for example, 13 teeth of a 180-tooth gear. Sector 50A serves to operate a pair of slave sector gears 46 and 47, each of which may be formed with 13 teeth of 15-tooth gear. Each slave sector gear has a sector shape lug, 46A and 47A between the ends of its toothed section, these lugs projecting into the path of movement of sector 50A and preventing rotation of the slave sector gears except when operated by the master sector gear.

Gear 46 is secured to a short shaft 48 rotatable in a bearing boss 49 on the base of housing 20. Shaft 48 is coaxial with pump driving output shaft 30, and is normally coupled thereto by a clutch sleeve 51 biased to the coupling position by a sping 52. Sleeve 51 has a collar 53 engaged by a pin 54 on a lever arm 56 secured to a shaft 57 mounted through a bearing in a side wall of housing 20. On the outer end of shaft 57 is a crank arm 58 having an operating handle 55. Handle 55 is spring biased toward housing 20 to engage a pin 61 in either one of a pair of apertures in an arcuate land 62 on the outer surface of the side wall of housing 20. In one position of handle 55, shaft 30 is coupled for driving by slave sector gear 46 and, in the other position of handle 55, shaft 30 is uncoupled so that pump mechanism P is inoperative.

Slave sector gear 47 is secured to a shaft 63 mounted in bearings in the base and cover of housing 20. Near its upper end, shaft 63 has a pinion 64 secured thereto and engaging a spur gear 66 on shaft 22 mounted through the cover of housing 20. Drive sprocket 23A of chain drive 23 is secured to the upper end of shaft 22. Once each revolution of master gear 50, sector 50A successively strikes lugs 47A and 46A, rotating gears 47 and 46, in succession, to respectively effect one stepping of carrier C followed by one charging operation of pump mechanism P.

Tank support 15 has a horizontal outwardly extending flange 81 which rests on and is bolted to the rib 13 on base B-2 with the interposition of heat insulating material. Flange 81 merges smoothly into a short cylindrical wall 82 which bounds a horizontal annular support base 83. The inner periphery of support base 83 merges smoothly into an outwardly concave wall 84 engaging the inner lower periphery of annular tank T. A flat annular wall 86 extends inwardly from the upper end of wall 84 and is centrally apertured for passage of shaft 25.

The bottom wall 87 of tank T rests on and extends outwardly beyond support base 83, where it merges smoothly with outer wall 88 of tank T. Walls 87 and 88 have a plurality of radial and longitudinal ribs 89 formed therein and projecting into the tank, these ribs extending from the junction of walls 87 and 88 a substantial distance along the breadth of each wall. At the ejection station, wall 88 has a substantially rectangular offset 90 projecting outwardly therefrom.

At a fixed angular position, the concave wall 84 of tank support 15 has a rib 80 deformed therein and arranged to nest in a similarly shaped rib 85 formed at a pre-set angular position along the junction of walls 74 and 88. Ribs 80 and 85 assure proper orientation of the stainless steel tank T on support 15 when the readily removable tank is removed for cleaning or replacement. For a purpose to be described, tank T has a relatively low cylindrical partition 91 intermediate and parallel to walls 74 and 88, this partition extending up from wall 88 for somewhat less than one-half the height of the inner and outer side walls. Also for a purpose to be described, bottom wall 87 of tank T is formed with a pair of hemispherical depressions 92, angularly aligned with the outlet of hopper H when tank T is properly oriented on support 15 and each located substantially midway between a wall 74 or 87 and partition 91.

The pump body 75 includes an elongated base 93, extending radially of shaft 78 and apertured to receive this shaft, and having an upstanding flange 94 at its end nearest shaft 78. A pump cam 95 is keyed to the upper end of shaft 78 and overlies base 93. This cam has a cam groove on its under-surface in which is engaged a roller or pin (not shown) on a valve operating lever 96 pivoted at one end to body 75. A roller 97 mounted eccentrically on the upper surface of cam 95 engages in a slot 98 in a modified Scotch yoke 100 having an end 101 slidable in a central notch 102 in the upper edge of flange 94.

A one-piece aluminum bronze body 105 is disengageably secured on the outer end of base 93 by means of a T-screw 106, and includes a pair of pump cylinders 107 extending perpendicularly from and communicating with a valve cylinder 108 receiving a rotary valve 110. Valve cylinder 108 has a pair of upwardly extending tubular bosses 111 telescopingly and removably seating a pair of tubular outlet nipples 112 extending from a rotary shut-off valve assembly 113 at the outlet of hopper H. In axial alignment with bosses 111, valve cylinder 108 has a pair of outlets 114 vertically over and aligned angularly with the "charge" position of tank T and respectively in substantial vertical alignment with depressions 92 in the bottom wall 87 of tank T.

Valve 110 is formed with a pair of axially extending arcuate recesses 115 each aligned longitudinally with a cylinder 107, a boss or inlet 111, and an outlet 114. The valve is oscillatable between a first position, in which each recess 115 connects an inlet 111 to a cylinder 107, and a second position, in which each recess 115 connects a cylinder 107 to an outlet 114. For this purpose, an arm 116 is secured to a shaft 117 integral and coaxial with valve 110 and projecting from one end of valve cylinder 108. A rod 120 is disengageably coupled to arm 116 through the medium of a universally movable coupling 118. A second universally adjustable coupling 119 connects the opposite end of rod 120 to the free outer end of operating lever 96, so that valve 110 is oscillated by pump cam 95. A length adjustment means 121 is provided midway of the two-part rod 120.

Pump cylinders 107 are provided with pistons 125 of "Teflon" or other suitable inert plastic composition material, and each piston has secured thereto a piston rod 103. The opposite ends of piston rods 103 extend through apertures in the ends of a cross bar 122 of yoke 100. Lock pins 104 anchor rods 103 in cross bar 122.

Pump cam 95 is intermittently rotated through one revolution by shafts 30 and 78 operated intermittently by the gearing G as previously described. At the start of each revolution of cam 95, valve 110 is in a position connecting inlets 111 to cylinders 107, and pistons 125 are at the inner ends of these cylinders. As an initial operation, cam 95 retracts yoke 100 to draw pistons 125 outwardly. This creates a vacuum, drawing dough into cylinders 107. Valve 110 is then rotated to the discharge position connecting cylinders 107 to outlets 114, and severs the dough at the junction of inlets 111 and the inner surface of valve cylinder 108. Cam 95 then advances yoke 100 to move pistons 125 into cylinders 107 to force the dough through outlets 114. Valve 110 is then rotated back to the charging position to sever the gobs of dough at outlets 114, and these gobs drop into the hot oil in tank T and, momentarily, into shaping recesses 92 to allow the gobs to enter the shaping recesses 92, the heating coils 60 may be interrupted in the sector containing the recesses 92.

Each polygonal side of skirt 70 of carrier C has a "bucket" 130 slidably mounted thereon for vertical movement. For this purpose, each polygonal side 69 of skirt 70 is formed with a relatively elongated vertical slot 123 nearer to one side edge than to the other, and with a relatively short vertical slot 124 near such other side edge.

Each bucket 130 is U-shape in plan, comprising a base wall 131 substantially the width of a polygon side 69 but of substantially less height than such side, and a pair of side walls 132 normal to and integral with base wall 131. The length of each side wall 132 is slightly less than the distance between a polygon side 69 and the outer wall 88 of tank T, and each side wall has a slot 133 fitting over partition 91.

Figure 12:
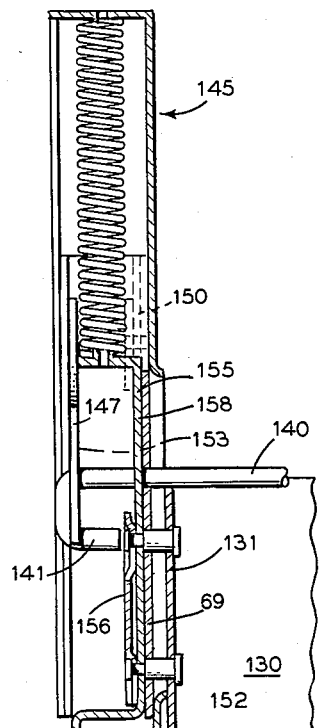
FIG. 12 is a similar view at right angles to FIG. 11.
Figure 11:
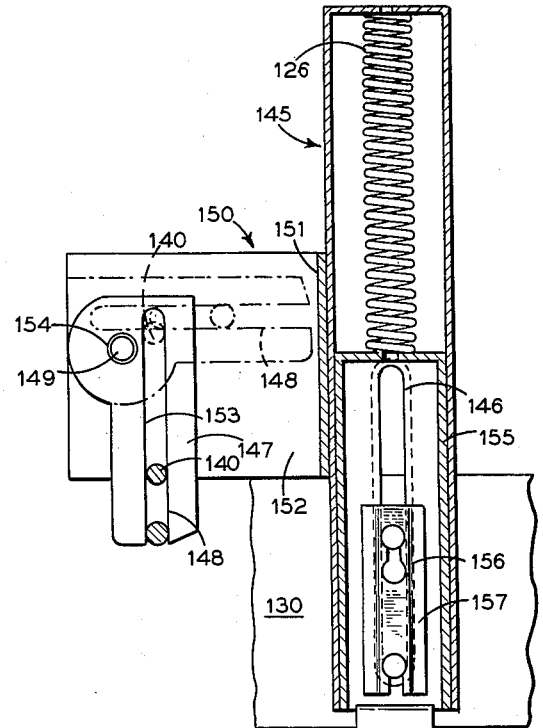
FIG. 11 is a vertical sectional view of the bucket elevating and cover operating mechanism.
Figure 14:
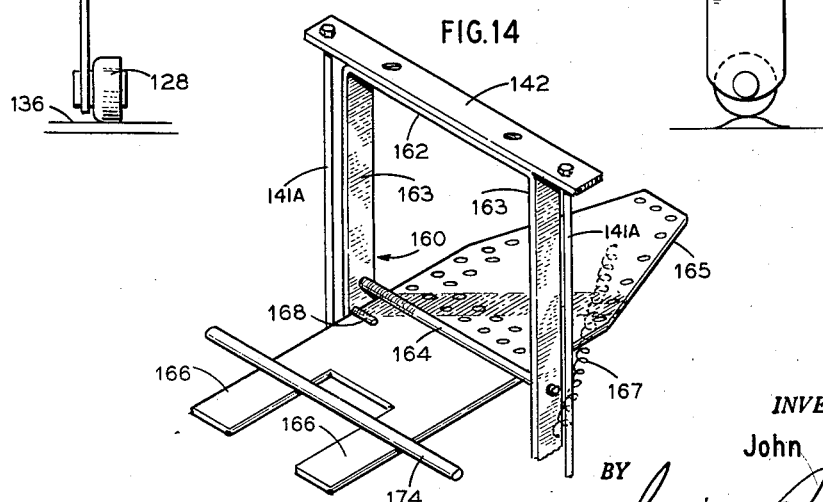
FIG. 14 is a side elevation view of the ejector mechanism.

The base wall 131 of each bucket has welded thereto a pair of studs 134 in vertically spaced relation and extending through slot 123 of polygon side 69. On the inner side of polygon wall 69, studs 134 extend through an elongated slot 146 in a relatively fixed substantially rectangular cross section spring housing and guide 145 (FIGS. 11 and 12), through a pair of vertically spaced apertures in a relatively movable substantially rectangular slide 155 telescoped in the lower portion of guide 145, and through a pair of vertically spaced apertures in an arch type spring 156 having legs 157 bearing against the inner wall 158 of slide 155.

An angle bracket 150 has a short leg 151 secured, by welding or brazing, to a side wall 147 of guide 145, and a long leg 152 extending over the liner surface of polygon wall 69. Leg 152 has a slot 153 aligned with slot 124 and is formed with an aperture 154 somewhat beyond slot 153. A dog 147 is pivoted on a stud 149 extending through aperture 154, and has an open ended slot 148 normally aligned with slots 124 and 153.

Each bucket 130 has a perforated cover 135 secured to a hinge pin 140 rotatably mounted along the upper edge of one side wall 132. Pin 140 extends through slots 124 (in wall 69), 153 (in bracket 150), and 148 (in dog 146). The inner end of pin 140 has a reversely bent arm 141 extending parallel to the pin and engaged in slot 148 of dog 147 but not in either slot 153 or 124. Normally, bent end 141 is vertically below the main body of pin 140.

A coil spring 126 is disposed in guide 145 and seated on the upper ends of this guide and of slide 155. Spring 126 biases slide 155 downwardly, and thus biases buckets 130 to the lower position in tank T, the downward movement being limited by slot 123 to a position in which the lower edges of buckets 130 are still substantially above the lower wall of tank T and slots 133 still clear partition 91. An arm 127 extends vertically downwardly from the bottom wall of slide 155, and a roller 128 is rotatably mounted in the lower end of arm 127 and engages a cam track 136 in tank T.

In the lower position of buckets 130, covers 135 are in the horizontal position closing the upper ends of the buckets. Just before the discharge station, rollers 127 engage an elevated portion of track 136, and buckets 130 are raised against the bias of springs 126 so that their upper edges extend above the normal level of the heated cooking oil in tank T. As the buckets are raised, pins 14 move upwardly in slots 124, 153 and 148. As pins 140 reach the upper ends of slots 148, they pivot dogs 147 about studs 149, in a counterclockwise direction as viewed in FIG. 11. The bent ends 141 of pins 140 are thus swung counterclockwise about the hinge axis of covers 135, and the covers are swung to the open, vertically extending position.

Buckets 130 remain elevated and open as they pass the discharge and charge stations. After the dough globs have risen and turned over at the surface of the cooking oil in tank T, rollers 128 roll over a descending portion of cam track 136 so that springs 126 force slides 155 and buckets 130 downwardly. During this movement, hinge pins 140 swing dogs 147 clockwise to swing bent ends 141 clockwise to close covers 135 to depress the partly cooked dough globs below the surface of the cooking oil.

The ejection station is at the rectangular offset 90 in the outer wall 88 of tank T. A housing 137 is positioned at and embracing offset 90, this housing having a central outwardly extending chute 138 sloping outwardly and downwardly. A pair of rods 141A are vertically slidable in laterally spaced portions of housing 137 and interconnected at their ends by cross-bars 142 and 143. Coil springs 161, embracing rods 141A, normally bias slide 141—142—143 downwardly. A depending inverted U-shape strap 160 has its base 162 secured to bar 142, and a horizontal shaft 164 interconnects the lower ends of its legs 163.

A perforated ejector trough 165 is swingable on shaft 164 and is formed with a pair of extensions 166 extending outwardly of the shaft. A spring 167 normally biases trough 165 to a horizontal position in which it engages a lug 168 on one leg 163. Trough 165 normally lies substantially beneath the lower edges of buckets 130, partition 91 being cut away adjacent offset 90, for this purpose.

The ejector mechanism is operated by the cam 44. Adjacent cam 44, the wall of gear housing 20 has an offset apertured lug formation 171 forming a fork in which is pivoted a lever 170. The shorter arm of lever 170 carries a roller cam follower 172 riding in a cam track 44A of cam 44. The longer arm of lever 170 has a slot 144 engaging a pin 173 in lower cross-bar 143 of the ejector slide. As each bucket is positioned at the ejector station, cam 44 swings lever 170 to raise the ejector slide. Trough 165 is moved horizontally upwardly, carrying a pair of cooked food items, until extensions 166 engage a crossbar 174 in housing 137. Upon further upward movement, trough 165 is pivoted about the axis of shaft 164 to form an inclined plane forcing food items thereon to slide outwardly onto chute 138 for discharge from the tank. The trough 165 is then immediately lowered, with spring 167 moving it back to the horizontal position.

*Operation*

Summarizing, as each bucket 130 is elevated and momentarily stationary beneath the outlets of hopper H, pump mechanism P is operated by gearing G to draw two globs of dough from the hopper and eject them into the bucket on either side of partition 91. The dough globs drop through the oil in tank T and into shaping depressions 92 in tank bottom wall 87. The globs remain in depressions 92 only momentarily and then rise to the surface of the oil. The globs are then stepped along by walls 132 of the buckets. After about 10–12 seconds, the floating globs turn over at the surface of the oil.

Approximately 25 seconds after each bucket receives the dough charges, the roller 128 on extension 127 reaches a descending portion of cam track 136, and lowers buckets 130. Cover 135 is swung closed, as described, and forces the partly cooked items below the surface of the oil as the bucket is lowered beneath such surface. The globs are now about ¼ inch beneath the oil level. At the end of about three minutes, roller 128 engages an ascending portion of cam track 136 to raise the bucket and open the cover as the bucket reaches the ejector station. Cam 44 then raises the ejector slide to raise and tilt trough 165 to eject the cooked items onto chute 138. The cycle is then repeated.

*The vertical drum machine*

The embodiment just described is used to cook an item starting with the raw dough, and is particularly suited to large establishments and distribution centers. In smaller establishments, the items are received precooked, by the machine just described, and frozen. For these establishments, the reheating cooker now to be described is particularly suitable.

Referring to FIGS. 15 and 16, this cooker 200 comprises a base 206 supported on adjustable leveling legs 219. Base 206 forms part of a casing enclosing a tank 205 and comprising front wall 201, rear wall 202, side walls 203 and top wall 204, all parts being of stainless steel. Tank 205 has a base 207 supported on base 206, a front wall 208, a rear wall 211, and side walls 212. Walls 208, 211, 212 extend for about ⅔ the height of the casing vertical walls.

Within tank 205, there is a relatively heavy U-shape support bracket including a base 213 and legs 214. A fixed axle 215 extends between legs 214 somewhat below the upper edge of tank 205. Axle 215 stationarily supports a fixed drum member 220 including circular front wall 221 and an inner and outer radially spaced cylindrical wall 222 and 223 integral with wall 221. Wall 221 lies against the front leg 214 of bracket 210, and has an integral hub 224 secured to axle 215 by a set screw 216.

Associated with fixed drum 220 is a rotatable carrier 225 including a circular plate 226 spaced slightly from the free edges of walls 222, 223, and integral radial vanes 227 extending between and in slightly spaced relation to walls 222, 223 and having their free end edges slightly spaced from wall 221. Plate 226 has a hub 228 rotatable on shaft 215, and is axially spaced a short distance from the rear leg 214 of bracket 210.

Carrier 225 is rotated by an electric motor 230 mounted on an extension 217 of base 206. The drive or output shaft 231 of motor 230 has secured thereto a relatively small diameter sprocket 232 driving, through an endless chain 233, a relatively large diameter sprocket 234 secured on an axle 236 rotatable in the upper end of rear leg 214 of bracket 210. A pinion 237, fixed to axle 236 between bracket leg 214 and plate 226, engages a large diameter spur gear 235 secured by studs 238 to plate 226.

Top wall 204 has an opening 218 in which is partly inserted a charging hopper 240 having its inner end extending through an opening 241 in drum wall 224 and substantially flush with the inner surface of the latter. Spaced clockwise from hopper 240, as viewed in FIG. 15, by the angular spacing of vanes 227, inner wall 223 of drum 220 has an opening 242. Below opening 242, a trough or chute 245 extends downwardly and forwardly through a rectangular outlet opening 243 in drum wall 221 and casing wall 201.

Heating coils 244 extend downwardly along the inside of one side wall 212 of tank 205 and along the base 207 thereof. These coils are energized through conductors 246 connected to a control thermostat 247 on wall 201, the thermostat being connected to a 220-volt supply by a cord 248. Motor 230 is controlled by a switch 250 connected to a 110-volt supply by a cord 251.

The cooking oil is maintained at a level slightly below the fixed axle 215, and fills the tank and fixed drum 220 to this level. There are, in a practical example, twelve vanes 227, and carrier 225 makes, for example, one revolution in three minutes and nineteen seconds, motor 230 being a low fractional HP gear reduction motor. The frozen pre-cooked items dropped into hopper 240 fall into a compartment defined by walls 222, 223 and a pair of adjacent vanes 227. The items are then carried counter-clockwise, as viewed in FIG. 15, through the hot oil in tank 205 and are lifted from the oil before reaching opening 242 in drum wall 222. At this opening, the hot items fall onto chute 245 and are discharged through opening 243. Several items at a time may be charged through hopper 240.

All parts contacting the food or heating oil are stainless steel, and vanes 227 as well as the fixed drum walls and carrier wall 226 may be perforated.

While specific embodiments of the invention have been shown and described in detail to illustrate the application of the invention principles, it will be understood that the invention may be embodied otherwise without departing from such principles.

What is claimed is:

1. Cooking apparatus comprising, in combination, an annular tank arranged to contain cooking oil; heating means for the oil; a carrier rotatable about a vertical axis substantially coincident with that of said tank and having an annular skirt depending into said tank adjacent the inner annular wall of the latter; a plurality of partition means each slidably mounted on said skirt for movement vertically thereof in circumferentially adjacent relation; each partition means including a pair of circumferentially spaced walls extending transversely between the inner and outer circumferential walls of said tank; driving means for rotating said carrier to move said partition means around said tank; a charging station arranged at a selected position circumferentially of said tank to charge uncooked food items into the latter at such position for movement circumferentially of said tank by said partition means; an ejection station arranged circumferentially adjacent said charging station for removing cooked food items from said tank; said ejection station being in advance of said charging station in the direction of movement of said partition means; a cover hinged to the upper edge of one wall of each partition means for movement between an open position and a closed position extending substantially horizontally toward the other wall thereof; means operable to conjointly elevate each partition means and open the cover thereof as the partition means is advanced to said ejection station; and means operable to conjointly lower each partition means below the surface of the cooking oil and close the cover thereof as the partition means reaches a pre-selected position beyond said charging station to immerse the food items therein completely in the cooking oil.

2. Cooking apparatus comprising, in combination, an annular tank arranged to contain cooking oil; heating means for the oil, a carrier rotatable about a vertical axis substantially coincident with that of said tank and having a polygonal skirt depending into said tank adjacent the inner annular wall of the latter; a plurality of partition means each slidably mounted on a face of said polygonal skirt for movement vertically thereof in circumferentially adjacent relation; each partition means including a pair of circumferentially spaced walls extending transversely between the inner and outer circumferential walls of said tank; driving means for rotating said carrier to move said partition means around said tank; a charging station arranged at a selected position circumferentially of said tank to charge uncooked food items into the latter at such position for movement circumferentially of said tank by said partition means; an ejection station arranged circumferentially adjacent said charging station for removing cooked food items from said tank; said ejection station being in advance of said charging station in the direction of movement of said partition means; a cover hinged to the upper edge of one wall of each partition means for movement between an open position and a closed position extending substantially horizontally toward the other wall thereof; means operable to conjointly elevate each partition means and open the cover thereof as the partition means is advanced to said ejection station; and means operable to conjointly lower each partition means below the surface of the cooking oil and close the cover thereof as the partition means reaches a pre-selected position beyond said charging station to immerse the food items therein completely in the cooking oil.

3. Cooking apparatus comprising, in combination, an annular tank arranged to contain cooking oil; heating means for the oil; a carrier rotatable about a vertical axis substantially coincident with that of said tank and having a polygonal skirt depending into said tank adjacent the inner annular wall of the latter; a plurality of partition means each slidably mounted on a face of said polygonal skirt for movement vertically thereof in circumferentially adjacent relation; each partition means including a base slidably juxtaposed to a polygon face and a pair of walls at each end of said base extending transversely between the inner and outer circumferential walls of said tank; driving means for rotating said carrier to move said partition means around said tank; a charging station arranged at a selected position circumferentially of said tank to charge uncooked food items into the latter at such position for movement circumferentially of said tank by said partition means; an ejection station arranged circumferentially adjacent said charging station for removing cooked food items from said tank; said ejection station being in advance of said charging station in the direction of movement of said partition means; a cover hinged to the upper edge of one wall of each partition means for movement between an open position and a closed position extending substantially horizontally toward the other wall thereof; means operable to conjointly elevate each partition means and open the cover thereof as the partition means is advanced to said ejection station; and means operable to conjointly lower each partition means below the surface of the cooking oil and close the cover thereof as the partition means reaches a pre-selected position beyond said charging station to immerse the food items therein completely in the cooking oil.

4. Cooking apparatus as claimed in claim 3 including an elongated hinge rod oscillatable in the upper edge of said one wall, said cover being fixedly secured to said rod; operating means for each partition means including a slide movable vertically on the inner surface of the associated polygon face; means extending through a first vertical slot in the associated polygon face and connecting the base to the associated slide; said hinge rod extending through a second vertical slot in the associated polygon face; and hinge rod rotating means mounted on the inner surface of the associated polygon face and engaging said hinge rods; said hinge rod rotating means, upon elevation of the partition means by the associated slide, rotating said hinge rod to open the attached cover.

5. Cooking apparatus as claimed in claim 4 including a roller carried by said slide and engaging a circular cam track in said tank; and means biasing said slide downwardly to maintain said roller engaged with said cam track.

6. Cooking apparatus as claimed in claim 4 in which said hinge rod rotating means comprises a dog pivotally suspended for oscillation about an axis spaced laterally from said second slot and having a downwardly opening slot receiving said hinge rod; said hinge rod having a reversely bent end engaged only in said open ended slot; whereby, as said hinge rod is moved upwardly, it will rotate said dog to revolve said reversely bent end.

7. Cooking apparatus as claimed in claim 1 in which said covers are perforated.

8. Cooking apparatus as claimed in claim 1 in which said driving means includes a relatively large diameter master sector gear having teeth extending over a pre-set small arc of its periphery; a first relatively small diameter slave pinion rotated through one complete revolution once during each rotation of said master gear; a second relatively small diameter slave pinion rotated through one complete revolution once during each rotation of said master gear immediately subsequent to rotation of said first slave pinion; charging means at said charging station operable, upon rotation of said first slave pinion, to drop at least one uncooked food item into the partition means then angularly aligned with said charging station; and a vertical rotatable shaft mounting said carrier and rotated through an arc subtended by a partition means during each revolution of said second slave pinion by a driving connection to the latter.

9. Cooking apparatus as claimed in claim 8 including; an ejector at said ejection station operable, when actuated, to lift a cooked food item from the partition means then angularly aligned with said ejection station and discharge the item outside the tank; a cam continuously rotated by said driving means; and a cam follower means connected to said cam and to said ejector to actuate the same; said cam actuating said ejector means immediately in advance of rotation of said first slave pinion by said master gear.

10. Cooking apparatus as claimed in claim 9 in which said ejector comprises a perforated plate hinged to a slide upon an axis substantially parallel to a tangent of the walls of said tank; said slide being mounted for movement vertically of the outer wall of said tank by said cam follower means; means normally biasing said plate to a horizontal position; and abutment means engaged by said plate upon upward movement of said slide and effective to pivot said plate upwardly and outwardly.

11. Cooking apparatus as claimed in claim 8 in which said tank has a substantially central annular vertical partition between its inner and outer walls, the walls of said partition means being slotted to receive said partition.

12. Cooking apparatus as claimed in claim 8 in which said charging means comprises a hopper mounted above said tank at said charging station; a cylindrical valve casing extending across the lower discharge end of said hopper and having diametrically aligned openings in angular alignment with said discharge end and port means angularly midway of said openings; a valve rotatable in said valve casings between a first position connecting said port means to said hopper and a second position blocking the hopper opening and a second position connecting said port means to the other casing opening; pump cylinder means connected to said port means; piston means reciprocable in said pump cylinder means; and cam mechanism operable by said first slave pinion, during each revolution of the latter, to first draw said piston means away from said port means, with said valve in said first position, to draw dough from said hopper into said pump cylinder means, then to rotate said valve to said second position to cut off the dough, then to advance said piston means toward said port means to discharge dough pieces into said tank, and then to rotate said valve back to said first position.

13. Cooking apparatus as claimed in claim 12 in which said tank has a substantially central annular vertical partition between its inner and outer walls, the walls of said partition means being slotted to receive said partition; said valve casing having a pair of sets of openings and port means spaced axially thereof and radially of said tank on either side of said partition; said pump cylinder means including a pair of pump cylinders; and said piston means including a pair of pistons operable in unison.

14. Cooking apparatus as claimed in claim 13 including a pair of radially aligned spherical depressions in the bottom wall of said tank on either side of said partition to engage the dough pieces dropped into the tank to shape the latter before they rise through the cooking oil.

References Cited in the file of this patent

UNITED STATES PATENTS

| | | |
|---|---|---|
| 1,340,805 | Thompson | May 18, 1920 |
| 1,817,887 | Hunter | Aug. 4, 1931 |
| 1,855,922 | Mosher | Apr. 26, 1932 |
| 2,760,426 | Norris | Aug. 28, 1956 |
| 2,853,937 | Peck | Sept. 30, 1958 |